Patented Aug. 30, 1938

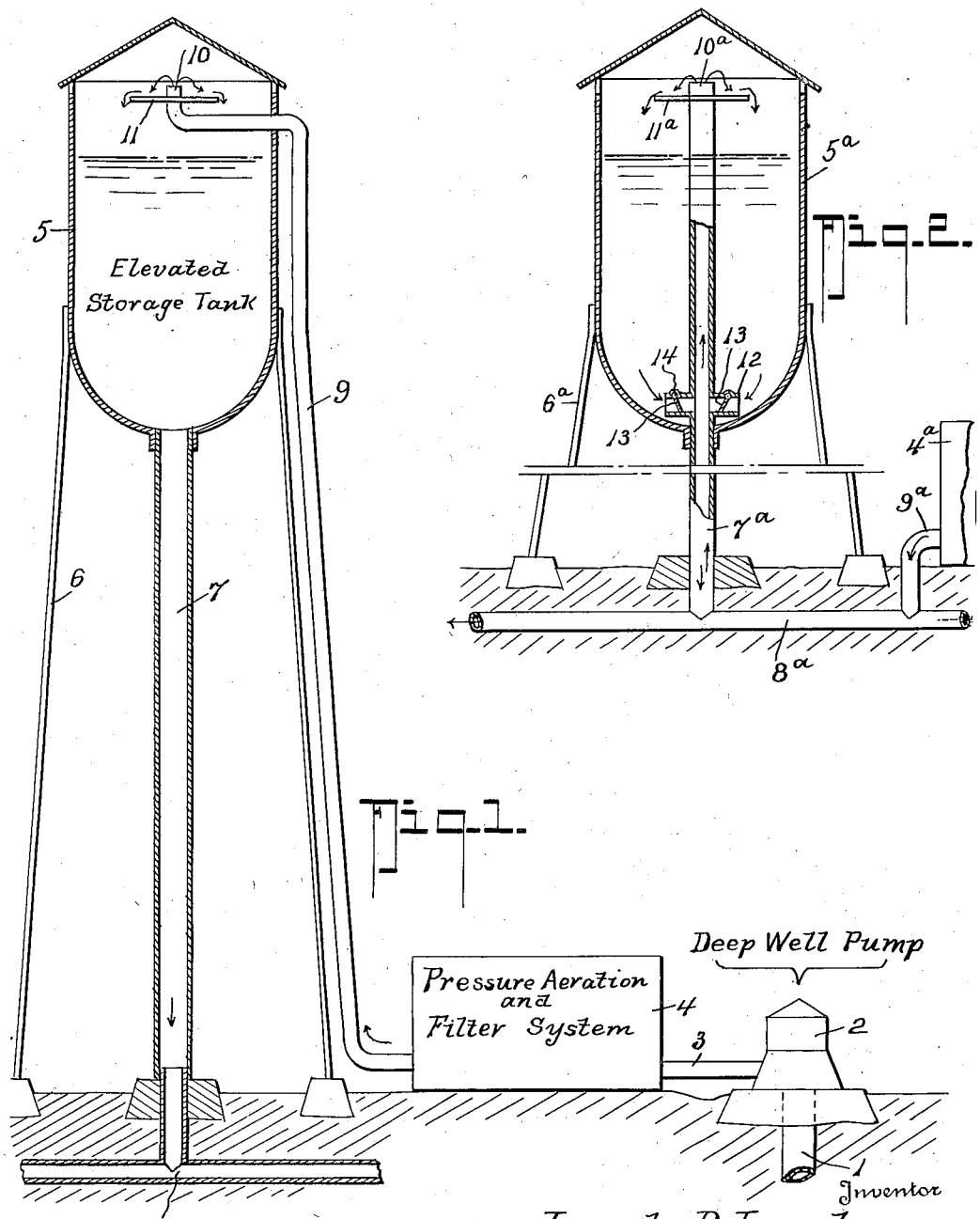

2,128,617

UNITED STATES PATENT OFFICE 2,128,617

AERATION OF TREATED WATER IN ELEVATED TANKS

Joseph P. Lawlor, Ames, Iowa

Application November 10, 1937, Serial No. 173,914

1 Claim. (Cl. 210—26)

This invention relates to an improvement in the process of water treatment, particularly where such process involves the treatment of well waters for iron removal by aeration and filtration under pressure.

The invention has for its primary object to provide a process or method of treating the water for the removal of $CO_2$ gas which remains in the water after it has been treated by aeration and filtration under pressure or has been softened under pressure.

In the accompanying drawing I have shown a preferred and an alternative apparatus for carrying out my process.

Fig. 1 is a sectional and part elevational view, somewhat diagrammatic of the preferred way of carrying out the invention.

Fig. 2 is a similar view (parts being broken away) showing another way of carrying out the invention.

Referring to Fig. 1, 1 is the well casing of a deep well pump 2 which delivers the water at ground level to a pressure-treatment apparatus (diagrammatically illustrated at 4). The apparatus may be of any approved type of pressure-aeration and filtering apparatus, or it may be any approved apparatus for softening the water under pressure, such apparatus being well known.

5 designates the elevated storage tank (suitably supported at 6) into which the water, in carrying out my invention, is pumped from the pressure-treatment apparatus 4 via a pipe 9 and delivered into the tank at the top as at 10, a suitable baffle 11 being provided to disburse the water as it overflows the pipe.

The central riser 7 in this form of the invention acts only as a delivery duct to the mains 8.

Referring to Fig. 2, it will be seen that the pressure-treatment apparatus $4^a$ discharges through connection $9^a$ into the pipe $8^a$ adjacent the stand pipe $7^a$ and the pipe $7^a$ has a lateral duct (or ducts) 12 with a one-way check valve 13 to let water from the bottom of the tank flow into the stand pipe $7^a$, the water for filling the tank passing upwardly and being delivered at $10^a$ at the top of the tank $5^a$. The other parts in Fig. 2 which have the same reference number plus the index letter $a$ correspond to the similarly numbered parts in Fig. 1.

The common practice in aerating treated water in elevated tanks is to pump the water from the well through a pressure-treatment plant and thence direct into the mains. A certain proportion of this treated water goes direct to the consumer's faucets, never being exposed to atmospheric conditions between the time it leaves the well and emerges from the consumer's faucets. Some of the treated water gets into the elevated tank through the central riser pipe and the upper portion of the same becomes exposed to atmospheric conditions, but this is usually quite a small percentage of the total pumpage. The outside riser pipe 9 (Fig. 1) is not built, in standard practice, but the connection is made directly to pipe 8, as is $9^a$ to $8^a$ in Fig. 2.

Pressure aeration and filtration for the removal of iron is practiced in such systems as Reisert, Patent No. 938,075, and others designed to accomplish oxidation of iron in the water by the mixture of air and water under pressure.

Although this type of treatment is successful in so far as accomplishing the removal of iron by aeration and filtration under pressure, certain waters thus treated remain unstable, or "aggressive"; by unstable, or "agressive" it is meant that the treated water has a tendency to dissolve iron in the mains. Therefore, although the water as it leaves the plant is free of iron, after it travels some distance through the mains it again dissolves iron, and when it reaches the consumer it again contains an excessive amount of iron in solution.

It has been found that certain waters carry an excess amount of gases, such as $CO_2$ which cause this "agressiveness" in the water mains. When these gases are reduced, the water becomes more stable and less "agressive". It is a known fact that the solubility of these gases in water becomes greater as the pressure is increased above atmospheric. Therefore, when water is treated for iron removal by aeration and filtration under pressure, the principal object of such aeration is the introduction of oxygen which more readily goes into solution at pressure above atmospheric, resulting in rapid oxidation of iron, quickly changing the latter from the ferrous to a ferric state. These systems, however, frequently fail to release a sufficient amount of $CO_2$ gas, held in solution, as this can only be accomplished either by the introduction of neutralizing chemicals or exposing all of the water to atmospheric conditions. The introduction of chemicals is sometimes unsatisfactory. The exposure of water to atmospheric conditions at the ground surface defeats, to a certain extent, some of the other advantages found in completely enclosed pressure-treatment plants. For instance: (1) The fully enclosed pressure-treatment plant is more sanitary than open filters. (2) The pressure system requires only one pumping operation, while the other filters require two.

It is common practice to connect the effluent line on a pressure-treatment plant direct to the mains as shown at 9ª (Fig. 2). I have found that if the effluent line is not connected direct to the mains but rather a separate line 9 extended from the pressure-treatment system 4 direct to the top of the elevated storage tank, having all treated water travel via pipe 9, and discharged upon the surface of the water in the tank 5 to be exposed to atmospheric conditions, all of the water treated becomes better balanced. This is due to the fact that the water being exposed to atmosphere releases a majority of the $CO_2$ gas.

Fig. 2 shows another method of exposing the water to atmospheric conditions. In this method the separate outside riser pipe is unnecessary, aeration being accomplished by forcing the water up through the standard central riser pipe 7ª, extending this said pipe to the top of the tank and placing one or more check valves 13 in said pipe at the base of the tank, with the valve or valves so arranged as to permit the entrance but not the exit of water at that point, as hereinbefore pointed out. This method is practical only in the event the pumping capacity is greatly in excess of the demand throughout the mains, thereby resulting in practically all of the water being pumped backing up into the elevated storage tank. In such instances advantage is taken of this condition, making it possible to use the central riser pipe 7ª to accomplish aeration of a very large percentage of the water treated without the use of an extra riser.

While the invention primarily is concerned with the removal of $CO_2$ gas, it is obvious that other soluble gases may be released from the water by or during the use of my process. Also, the process can be used for treating water which has passed through iron removal plants, as well as softening plants, or both, all under pressure, by separate units.

From the foregoing description, taken in connection with the accompanying drawing, it is thought the process and its advantages will be clear to those skilled in the art.

What I claim is:

The method of treating water for the removal of iron and gases contained in the water which will react with iron, which consists in forcing the water, by a single pumping action, through a closed-to-atmosphere pressure filter which is adapted to remove the iron from the water passing through the filter, which filter is located at a relatively low level, then conducting the water, as it leaves the filter under a pressure above atmosphere, to the top of a storage tank which is located at a relatively high level and is open to atmosphere, and delivering the water into the top of the tank above the level of the water contained in the tank and at substantially atmospheric pressure, and dividing the water entering the tank into finely divided parts as it falls through the atmosphere onto the surface of the water in the tank.

JOSEPH P. LAWLOR.